July 10, 1962    H. SALVATORI ETAL    3,044,041
MULTI-CHANNEL RECORDING APPARATUS
Filed May 15, 1957    3 Sheets-Sheet 1
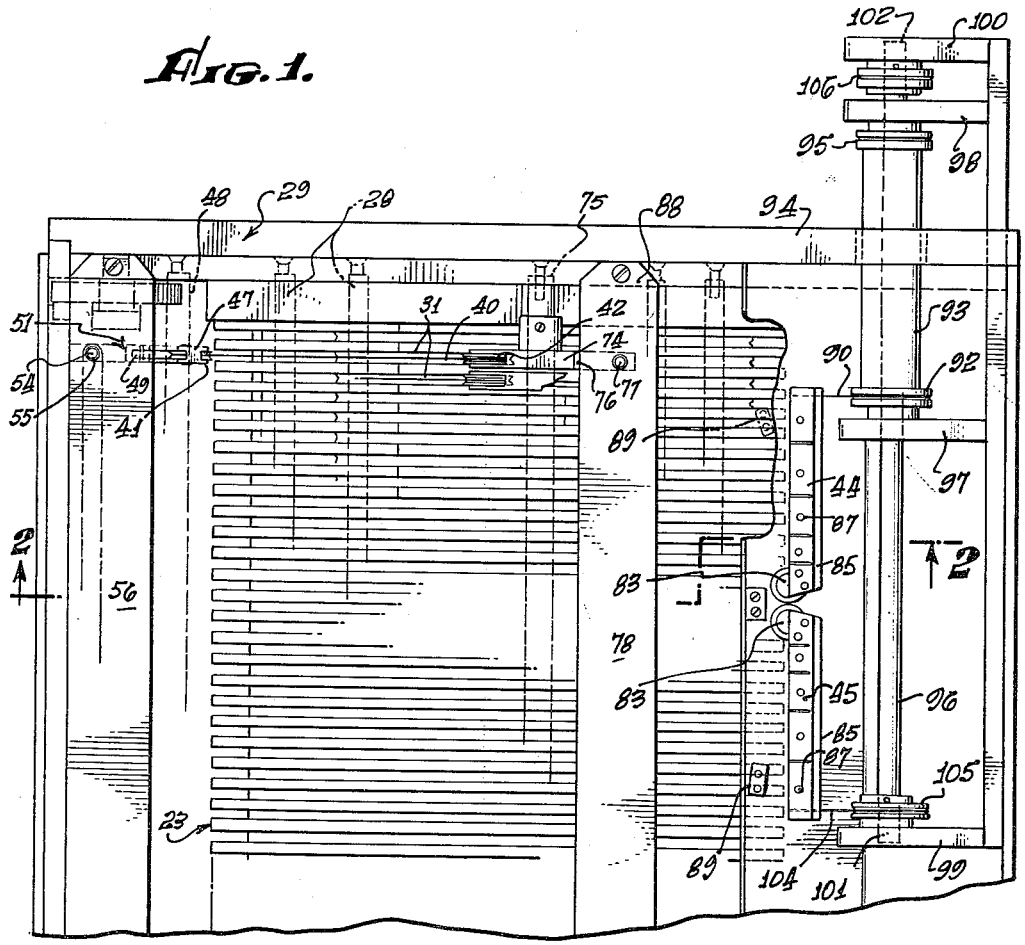
HENRY SALVATORI,
MELVIN J. WELLS,
HARDY GLENN,
INVENTORS.
By Spendly & Horn
ATTORNEYS.

July 10, 1962  H. SALVATORI ETAL  3,044,041
MULTI-CHANNEL RECORDING APPARATUS
Filed May 15, 1957  3 Sheets-Sheet 2
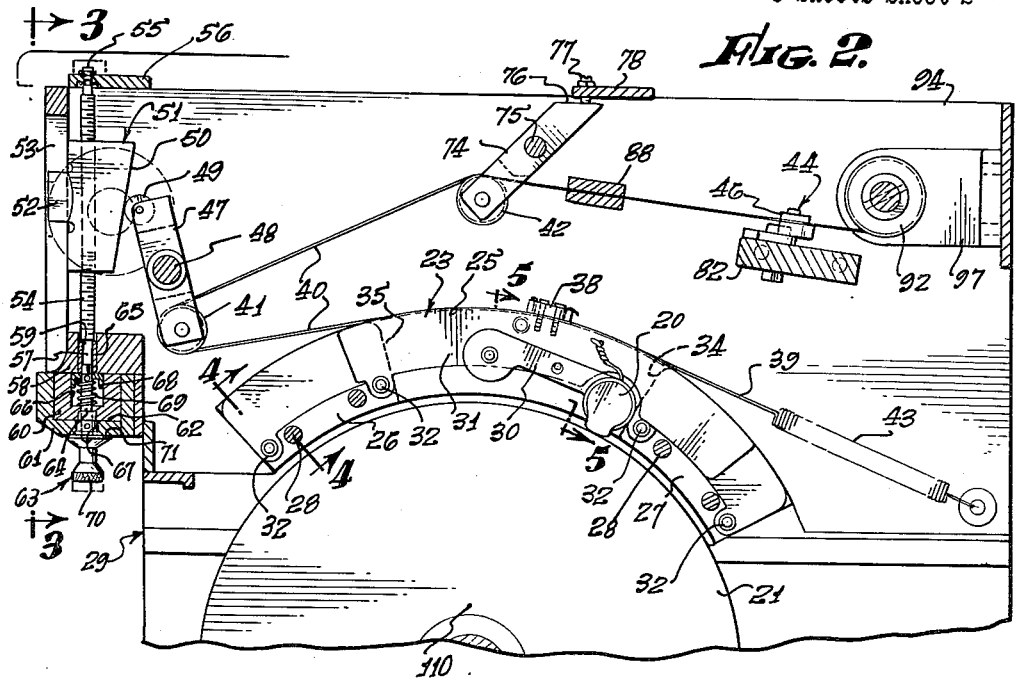
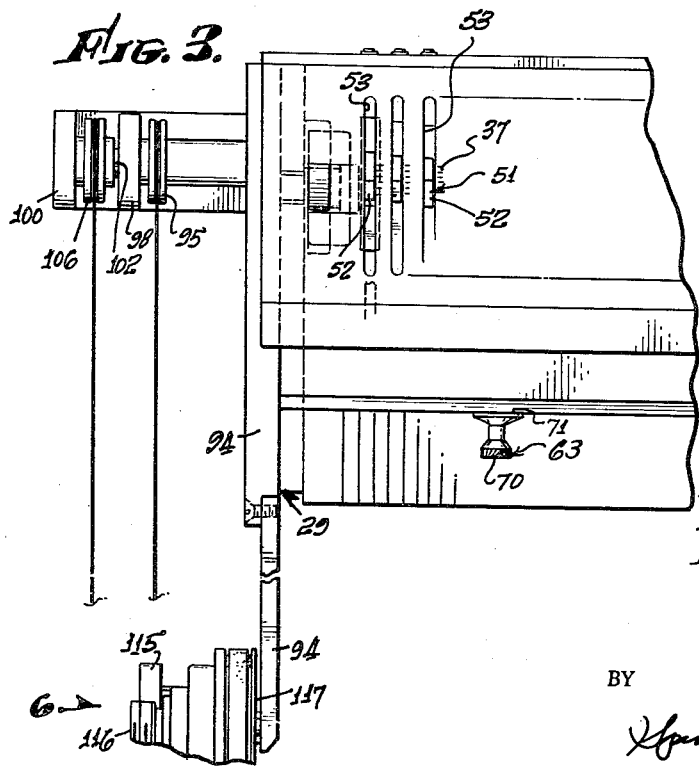
HENRY SALVATORI,
MELVIN J. WELLS,
HARDY GLENN,
INVENTORS.
BY
ATTORNEYS.

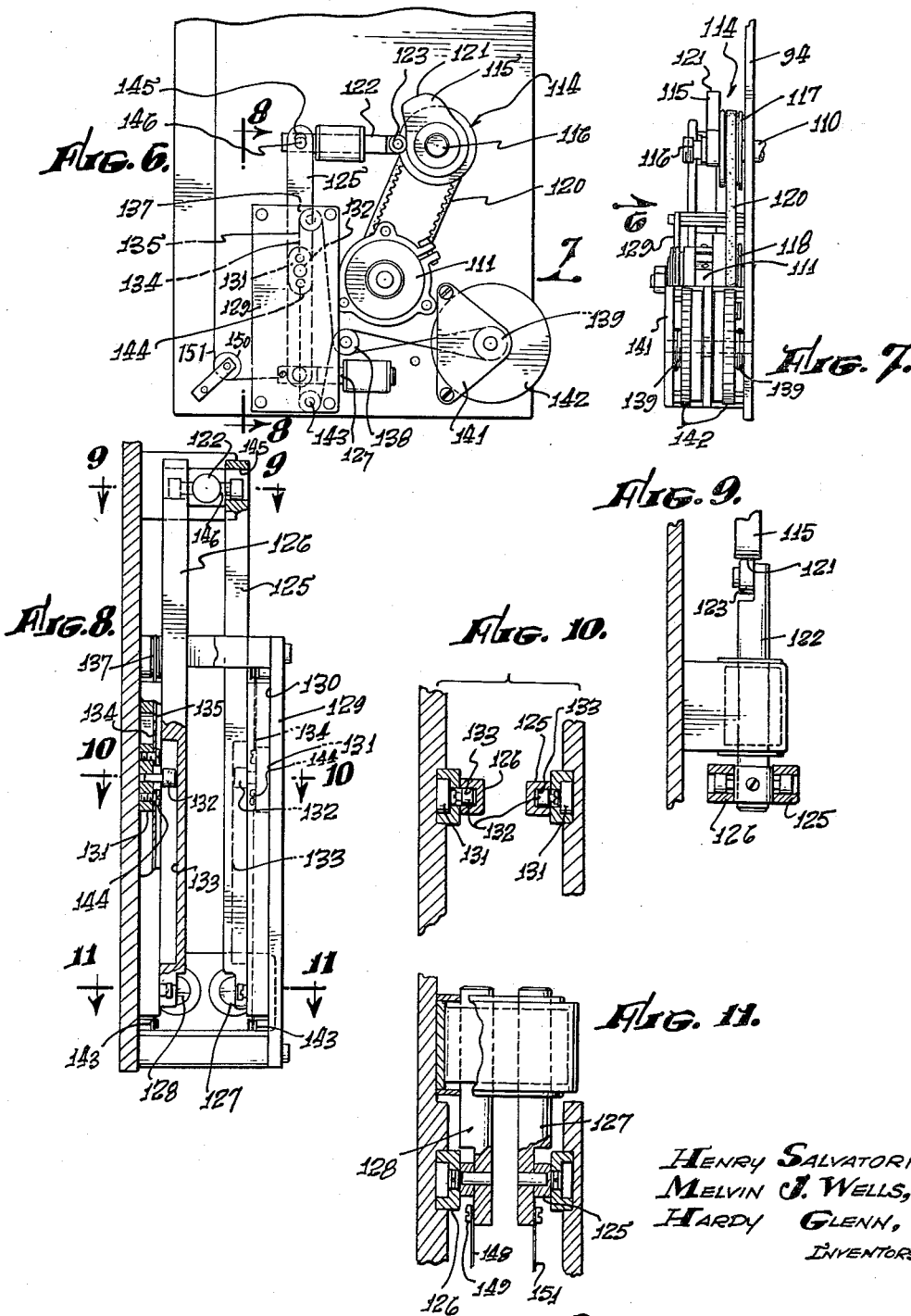

United States Patent Office 3,044,041
Patented July 10, 1962

3,044,041
MULTI-CHANNEL RECORDING APPARATUS
Henry Salvatori, Los Angeles, and Melvin J. Wells and Hardy Glenn, Torrance, Calif., assignors to Western Geophysical Company of America, Los Angeles, Calif., a corporation of Delaware
Filed May 15, 1957, Ser. No. 659,434
8 Claims. (Cl. 340—15)

This invention relates to multi-channel recorders and more particularly to an improved multi-channel recorder having independent time scale calibrations for each channel.

In many applications in which magnetic recording means are used it is desirable for special purposes to be able to introduce arbitrary time origin corrections and linear and non-linear time scale calibrations into the input or output of the magnetic record. In particular, it is desirable in many instances to be able to apply such corrections and calibrations independently and variably to each channel of a multi-channel recording system. Although such corrections and calibrations are advantageous in many applications wherein rotating drum recorders are used, they are particularly desirable in connection with magnetic recorders when employed in making seismographic records in geophysical exploration. Accordingly, the present invention will be described in connection with a magnetic tape recorder used in geophysical exploration as an illustrative application and embodiment.

In making seismographic surveys by the so-called reflection method, a record is made of the earth's disturbance produced at a given point by detonation initiated near the earth's surface at another point. In general, the record shows waves which have traversed paths close to the earth's surface and waves which have penetrated the earth and have been reflected by interfaces between two layers of different properties or characteristics. In many cases, several interfaces are present at varying depths and the record will show waves reflected from such interfaces. The amplitude of such reflected waves will vary over a considerable range depending upon the reflection coefficient associated with each interface.

For purposes of illustration, in a common arrangement of seismographic exploratory and recording apparatus used for seismographic profiling work, a plurality of seismometer or detector groups are disposed in contact with the ground in a preferably straight line at opposed sides of the shot point. A recording unit, provided with suitable amplifying and recording means is electrically connected to the detectors to amplify and record the electrical impulses produced by the detectors upon the arrival at each detector group of seismographic waves generated by an explosion at the shot point and reflected by the various underground formations.

The electrical impulses produced by the detector groups are recorded by multi-channel magnetic drum or tape recorders with a channel corresponding to each detector group. The desirability of being able to apply time origin corrections and time scale calibrations into a seismographic magnetic tape recorder is readily apparent, for example, in introducing "move out" corrections or corrections due to surface profile of the area being explored. Move out corrections are necessary since the detector groups are at varying horizontal distances from the shot point, and a greater time interval will be required for a reflected wave to reach the outermost detector group than the time interval which is required for the reflected wave to reach an inner detector group from an interface the same vertical distance below each. As the depth of the reflection increases, the time differential required to reach the various detector groups becomes smaller with the time differential approaching zero as the depth of reflection approaches infinity. In addition to the above move-out consideration, the various detector groups will in general be situated at various elevations so that it will be desirable to make time scale adjustments to reduce all readings to a common horizontal plane. Similarly, origin adjustments of the time scale are often necessary to compensate for varying amounts of near-surface weathered material under the different detector groups. In offshore exploration such corrections may be required by varying depths of water.

In the course of seismographic exploration a multi-channel magnetic tape is obtained as described above. In accordance with this invention a corrected time scale record many then be obtained from the uncorrected record obtained in the field. Such a corrected record facilitates analysis of the results of the seismographic exploration. The multi-channel recorder of the present invention having time origin corrections and time scale calibration is accordingly utilized to play back an uncorrected multi-channel magnetic recording to produce a corrected output, or conversely an uncorrected recording can be transmitted to the apparatus of the present invention to record a corrected magnetic record. That is, the uncorrected magnetic recording can be mounted upon the drum of the present apparatus with "reading" heads and played back in corrected form to furnish a corrected output from the apparatus which is used to record a corrected tape or to form a corrected visual record section. In using the apparatus as a recording unit the heads are recording heads. Signals from an uncorrected multi-channel recording are then transmitted to the apparatus as input signals and a corrected tape is recorded.

Accordingly, it is an object of the present invention to provide means for introducing time origin corrections into magnetically recorded data.

It is another object of the present invention to provide means for introducing time scale calibrations into magnetically recorded data.

It is a further object of the present invention to provide means for applying arbitrary time origin corrections and linear or non-linear time scale calibrations independently and variably at each channel of a multi-channel magnetic recording system.

It is still another object of the present invention to provide apparatus for applying time origin corrections and time scale calibrations to magnetic tape recorders of the type well known to the art.

A still further object of the present invention is to provide an improved means for mounting the magnetic head of a drum type magnetic tape recorder with respect to the rotating drum.

The novel features which are believed to be characteristic of the invention, both as to its organization and method of operation, together with further objects and advantages thereof will be better understood from the following description considered in connection with the accompanying drawings in which a presently preferred embodiment of the invention is illustrated by way of example. It is to be expressly understood, however, that the drawing is for the purpose of illustration and description only and is not intended as a definition of the limits of the invention.

FIGURE 1 is a plan view of a drum-mounted magnetic tape recorder in accordance with the present invention in which the time origin and time calibration adjusting means are shown in detail for a single channel in a multi-channel system;

FIGURE 2 is a view in elevation taken along line 2—2 of FIGURE 1 showing the head mounting means and time origin and calibration means of the present invention as applied to a magnetic recording drum of the type well known to the art;

FIGURE 3 is an enlarged partial view in elevation taken along line 3—3 of FIGURE 2;

FIGURE 4 is an enlarged partial view in elevation of the head mounting means taken along line 4—4 of FIGURE 2;

FIGURE 5 is a partial view corresponding to FIGURE 4 taken along line 5—5 of FIGURE 2;

FIGURE 6 is an end view in elevation of the apparatus of the present invention;

FIGURE 7 is a side view corresponding to FIGURE 6;

FIGURE 8 is a partial enlarged view taken along line 8—8 of FIGURE 6;

FIGURE 9 is a partial view taken along line 9—9 of FIGURE 8;

FIGURE 10 is a partial view in cross-section taken along line 10—10 of FIGURE 8;

FIGURE 11 is a view in cross-section taken along line 11—11 of FIGURE 8; and

FIGURE 12 is a view in perspective of a dynamic calibration lever arm in accordance with the present invention.

The present invention is a method and means for applying a time scale correction and calibration to each channel of a multi-channel recording apparatus of the type wherein a plurality of recording or reproducing heads, each of which defines a channel of the apparatus, are positioned proximate the surface of a rotating drum having a recording medium affixed to the surface thereof. By means of the present invention the time scale position of each magnetic head may be varied to achieve time origin corrections and time scale calibration which consists of applying to the time scale $t$, a transformation of the form $T_n = t + A_n + B_n F(t)$ where $T_n$ is the transformed time scale of the $n$th channel and $B_n F(t)$ is the time scale calibration function of the $n$th channel. The time delay and calibration system of the present invention comprises, for each channel, a magnetic head which is mounted to be movable circumferentially with respect to the surface of the rotating drum. A flexible cable of fixed length is affixed to the head which is normally urged opposite the direction in which the cable extends. The cable extends over a static correction means and thence to a dynamic calibration means. The static correction means provides variation of the origin point of the head by a predetermined amount $A_n$. Variation of the origin is effected by varying the distance of the static correction means from the axis of the drum. Similarly, the dynamic calibration means provides movement of the head in accordance with a predetermined function $F_n(t) = B_n F(t)$ during rotation of the drum.

Referring to the drawings, FIGURES 1 and 2 indicate the presently preferred embodiment of the invention used in conjunction with two series of twelve channels each of an illustrative multi-channel magnetic recorder of the type wherein a sensitized magnetic tape is carried by a rotating drum. In the plan view of FIGURE 1 the entire apparatus of the present invention is completely shown in only one channel for purposes of clarity of description. Again using a seismographic exploration apparatus as an illustrative application of the present invention, an amplifying unit is electrically connected to the detector groups to amplify the electrical impulses produced by the detectors upon the arrival at each detector of seismographic waves generated by an explosion at the shot point and reflected by the various underground formations, as discussed hereinbefore.

It is to be expressly understood that although seismographic exploration is used as an application in which the present invention is particularly desirable, the invention is not limited thereto and may be used in any application of a recording and/or play back apparatus of the type wherein an electrically sensitive surface is rotated upon a drum beneath a magnetic recording or reading head of the type well known to the art, in which it is desirable to introduce arbitrary time origin corrections or time scale calibrations.

The intensity of the electrical signal is transmitted by the detector group or other signal sources through an amplifier (not shown) to the magnetic recording head 20 in this embodiment where it is impressed upon the surface of an electrically sensitized tape which is affixed to the rotating drum 21 of the type well known to the art. Thus, the intensity of the electrical impulse received at the magnetic recording head 20 is proportional to the intensity of a reflected shock wave received at an individual detector group in the illustrative seismographic recording apparatus. The changes in the seismographic wave reaching the signal detector group will cause a variation in the signal intensity at the magnetic head 20 which has the characteristics of the reflected seismographic wave or other variable amplitude signal emanating from a signal source.

The record produced upon the recording medium affixed to the rotating drum 21 is thus a time scale record of the signal intensity with the time scale $t$ introduced by the movement of the recording medium at a constant speed past the recording head 20. The present invention achieves time origin corrections and time scale calibrations which consist of applying to the time scale $t$ a transformation of the form $T_n = t + A_n + B_n F(t)$ where the parameter $A_n$ and the function $B_n$ may vary from channel to channel as indicated by the index $n$.

The presently preferred embodiment of the present invention is described in connection with the application of the apparatus in which signals are transmitted to the apparatus from an uncorrected multi-channel tape recording to form a corrected tape recording. Thus, in this embodiment the magnetic heads are recording heads and a time scale corrected recording is produced upon a tape affixed to the rotating drum. These quantities are capable of being varied at will by means of the present invention. $A_n$ is, in particular, capable of being given the same value for all $n$ and $F_n(t)$ is, in particular, capable of being set equal to zero.

Referring now particularly to FIGURES 1, 2, 4 and 5, an improved means for mounting the magnetic head in accordance with the present invention is shown. A plurality of magnetic heads 20, equal in number to the number of channels in the magnetic recorder are arranged in side by side relationship. Each head 20 is mounted, in accordance with this invention, for movable contact with respect to the rotating drum 21 by means of a head mounting race 23. As shown in FIGURES 2, 4 and 5, the race 23 is arcuate with an inside diameter substantially equal to, but greater than the outside diameter of the drum 21 and the magnetic recording tape mounted thereon. Each head mounting race 23 comprises a first side plate 24 and a second side plate 25 which are affixed to, and separated by first and second spacer elements 26 and 27 such that the overall width of the head mounting race is substantially equal to the width of a single channel of the recording mechanism. The spacer elements 26 and 27 extend from each end of the side plates 24 and 25 and are also arcuate in configuration, but each subtends an angle substantially less than one half the angle subtended by the race 23. Thus, the side plates 24 and 25 and the spacers 26 and 27 define an arcuate opening in the head race in which the head 20 is mounted for arcuate movement. In the presently preferred embodiments as shown in FIGURES 1, 4 and 5 the spacer elements 26, 27 are integral with the inner surfaces of the first side plate 24 while the inner surface of the second side plate 25 is the outer surface of the first side plate of the next adjoining channel. The head race 23 is stationarily mounted with respect to the drum by means such as the anchor members 28 passing through each of the plurality of races and affixed to the chassis 29 of the recording apparatus. In the recording apparatus of the present embodiment, each magnetic head 20 rests in sliding contact with the recording medium mounted upon the rotating drum 21. The head 20 is accordingly affixed to a head mounting arm 30 which is in turn pivotally affixed to a rocker member 31. The head 20 is urged against the surface of the recording medium by the head mounting arm 30. The spacers 26, 27 have an outside arcuate diameter substantially equal to the inside diameter of the rocker member 31. A plurality of roller bearings 32 are rotatably affixed to the spacers and side plates at a radial position to support the rocker member 31, proximate the spacers as shown in FIGURES 2 and 4. Since the magnetic head 20 is substantially equal in width to the width of the space between the inner surfaces of the side plates 24, 25, an indentation is provided in the rocker member 31 conforming in configuration to the outward portion of the magnetic head as shown in FIGURES 2 and 5. Thus, the rocker mounting is arcuately movable and is supported upon roller bearings 32 to move within the head race 23. The limits of arcuate movement are determined by the inner surfaces 34, 35 of the spacer elements 26, 27, since the magnetic head 20 will abut the surface 34 at the position of movement to the right as shown in FIGURE 2, while the lever arm will abut the surface 35 at the position in which it is moved to the left in FIGURE 2.

As discussed hereinbefore the races 23 are arranged in side by side relationship coincident with the plurality of channels to be recorded. Thus, each race is parallel to a plane passing perpendicularly through the axis of the rotating drum and each head is movable along the circumference of the drum 21. The rocker member 31 and the magnetic head pivotally affixed thereto may be moved arcuately along the surface of the drum to vary the position at which the head produces or reads a signal upon the rotating recording medium affixed to the drum surface.

In order to control the arcuate position of each recording head in accordance with this invention, a bracket 38 is affixed to the rocker mounting 31 with flexible cables 39 and 40, or similar flexible holding means, extending oppositely therefrom substantially in the plane of arcuate movement of the rocker member 31. The first cable 39 is affixed to a tensioning means such as a coil spring 43 which is in turn affixed to the apparatus chassis to urge the rocker member 31 to the right of the head race 23 in FIGURE 2. The second cable 40 extends oppositely to the first cable 39 over a static correction pulley 41 and a trimmer pulley 42 and is affixed to a dynamic correction lever 44 as discussed in detail hereinafter. Since the length of the second cable 40 between the bracket 38 and the affixing point 46 on the calibration lever 44 is fixed, it may be seen that the arcuate position of the head 20 will be determined by the position of the movable affixing point 46 and the relative positions of the movable static correction pulley 41 and trimmer pulley 42. Thus, by varying the location of any of the three cable support points, i.e., the pulley 41, the pulley 42, or the lever affixing point 46, the second cable 40 will pull the rocker member 31 and head 20 to the left in FIGURE 2 against the force of the spring 43. Although a head assembly and cables 39 and 40 are shown for a single channel in FIGURE 2, the assembly is similar for all channels in the multi-channel system.

Referring first to the static correction pulley 41, it may be seen that if the trimmer pulley 42, and movable affixing point 46 for a given channel are maintained in a constant position, the position of the rocker member 31 and head 20 affixed thereto is varied by varying the position of the static correction pulley 41. Referring particularly to FIGURE 2 the static correction pulley 41 is rotatably mounted at one end of a pulley lever arm 47 which is pivotally mounted upon a pivot bearing 48 to rotate substantially in the plane of the arcuate movement of the head 20, i.e., in a plane perpendicular to the axis of the drum 21. The pivot point 48 of the pulley lever arm 47 is approximately at the midpoint of the lever arm. At the opposed end of the lever arm 47 a cam follower 49 is rotatably mounted to bear against and maintain contact with a cam surface 50. The cam surface 50 is linear in this embodiment and is sloped upward and to the right in FIGURE 2. Since the rocker member is urged to the right by the first cable 39, the second cable 40 is maintained in tension and urges the static pulley 41 to the right to rotate the pulley lever arm 47 in a counterclockwise direction in the figure. Accordingly, if the cam 51 is lowered the cam surface 50 forces the cam follower 49 to the right, rotates the lever arm 47 clockwise and moves the rocker member 31 to the left against the pressure of the spring 43. Contrariwise, if the cam is raised, the lever arm is allowed to move counterclockwise by the cam follower and the spring 43 moves the rocker member to the right in the figure. Thus, the arcuate position of the head 20 may be varied with respect to the surface of the drum 21 by raising and lowering the cam 51. Therefore, the magnetic head 20, which is used to produce or read a signal upon the recording medium mounted upon the drum, is displaced along the direction of motion of the recording medium. Since the time scale of the magnetic record is measured along the direction of motion of the drum, such a displacement is tantamount to an alteration of the time origin. Time origin corrections $A_n$ for each channel are therefore made by varying the position of the cam 51 associated with the respective channel. That is, a cam 51 such as that described above and shown in FIGURE 2 is associated with each channel in the multi-channel recording apparatus and each cam is independently movable to vary the recording point of each channel. Referring again to FIGURES 2 and 3 each cam 51 is vertically movable within a cam slot 53 by which the cam is maintained in vertical alignment in the plane of movement. The cams are vertically maintained by the slot 53 by providing a protrusion 52 on the cam 51 which extends into the slot 53. The width of the protrusion 52 is substantially equal to, but less than the width of a slot 53, and the centerline of the slot 53 and protrusion 52 lie in a vertical plane coincident with, or parallel to, the vertical plane passing through the centerline of the cam 51 and cam shaft 54. Since the slots 53 of the respective channels pass through the front wall of the chassis 29 the protrusions are visible to afford a position indicating means for the position of the heads. That is, an index mark 37 is made on the protrusions to indicate the position of the cam in each channel relative to graduation marks placed proximate the slot 53, and consequently the position of the head 20 in each channel. The cam 51 is threadably mounted upon a mateably threaded cam shaft 54 which is substantially vertical and rotatable with respect to the cam 51. By rotating the shaft 54 the vertical position of the cam 51 is varied. The upper end 55 of the shaft 54 is rotatably affixed within a shaft bearing 56 positioned upon the upper surface of the chassis 29. The lower end 57 of the cam shaft 54 extends into a shaft bearing block 58 which extends throughout the longitudinal length of the chassis of the multi-channel recording apparatus and defines a plurality of vertical openings corresponding to the respective shaft 54 for each channel. The opening 59 is substantially equal to, but greater in diameter than the lower end 57 of the shaft and furnishes a bearing in which the shaft is free to rotate. Means for rotating each shaft are provided and in this embodiment a single shaft rotating means is utilized which may be moved to each shaft when that shaft is to be rotated to move the cam and vary the position of the head. As shown in FIGURES 2 and 3 a sliding block 60 is positioned within a longitudinal slide bearing 61 which is affixed to the chassis 29 beneath the bearing block 58. The sliding block 60 is slidably mateable with the slide 61 which in turn extends longitudinally across the width of the chassis with the longitudinal centerline of the slide vertically coincident with the centerline extending horizontally through the plurality of shaft bearings 59. The slide 61 defines a slot 67 extending through the lower wall 62 of the slide throughout the length of the slide beneath the shaft bearings 59. The slot is substantially symmetrical with respect to the vertical plane passing through the centerline of the slide and bearings. Means 63 for rotating the shaft 54 is rotatably affixed to the sliding block 60 and is vertically movable with respect thereto. In the embodiment shown, the lower end 57 of the shaft 54 is hexagonally shaped as a female member. The turning means 63 then comprises a vertically disposed shaft 64 having an upper male end 65 mateable with the lower end of the cam shaft 54. A depression 66 is provided in the sliding block 60 with a circular opening extending therefrom through the lower surface of the sliding block and symmetrical with the vertical centerline. The turning shaft 64 then extends upward through the slot 67 in the lower surface 62 of the slide 61, through the lower surface of the sliding block and into the shaft bearing 59 where it engages the cam shaft 54 when the turning means is in the upward position as shown in FIGURE 2. A spring loading block 68 is affixed to the shaft and a coil spring 69 in compression is mounted between the spring block 68 and the lower surface of the depression 66, whereby the turning shaft is normally urged upward to the position shown in which the turning shaft 64 engages the cam shaft 54. External operating means such as the knurled knob 70 having a stop surface 71 is affixed to the turning shaft 64 beneath the slide 61. The length of vertical travel of the turning shaft is such that the engaging end 65 of the shaft 64 is removed from the shaft bearing when the shaft is pulled to the downward limit at which the spring block 68 is against the lower surface of the depression 66; while the upper limit of travel of the turning shaft 64 is such that the male end 65 of the shaft 64 engages the female end 57 of the shaft 54 when the stop surface 71 is urged against the lower surface 62 of the slide 61 by the force of the spring 69. Thus, when the knob 70 is pulled downward the turning assembly comprising the sliding block 60 and turning shaft assembly can be moved along the slide 61 through the slot 67 to a position corresponding to the cam shaft 54 of any channel. When the vertical centerline of the turning shaft 64 corresponds with the centerline of the cam shaft for the channel the knob 70 is released and the male end of the shaft 64 engages the cam shaft 54 desired. By turning the knob 70, the position of the head 20 in the required channel can be varied, after which the turning means 63 may be disengaged and moved to another channel.

Referring again to FIGURE 2, after passing over the static correction pulley 41 the second cable 40, hereinafter termed the head cable 40, passes over, and is engaged by, the trimmer pulley 42. Again it may be seen that since the length of the head cable 40 is constant the position of the magnetic head 20 affixed thereto may be varied by varying the location of the trimmer pulley 42 when the static correction pulley 41 and affixing point 46 are held constant. It should be noted that the static correction pulley 41 and trimmer pulley 42 are located such that the cable 40 in passing from the bracket 38 (where it is affixed to the head rocker member 31) to the fixed point 46 passes over both pulleys and is maintained in tension at both pulleys. Thus, a movement of either pulley in either direction will allow movement of the head 20. The trimmer pulley 42 is rotatably mounted upon a pulley lever arm 74 which is pivotally mounted upon a pivot bearing 75 to rotate substantially in the plane of movement of the static correction pulley 41, i.e., in the vertical plane. The pivot point is approximately at the midpoint of the lever arm 74 and a substantially horizontal bearing surface 76 is provided at the upper end of the lever arm proximate the upper surface of the chassis 29. A trimmer adjustment screw 77 is mounted through the upper surface of the chassis by means of a bracket 78, with which it is threadably mateable. The bearing end of the trimmer screw 77 is in contact with the bearing surface 76 of the pulley lever arm 74. Thus, by turning the trimmer screw 77 to raise and lower the screw 77, arcuate movement of the pulley lever arm 74 about the pivot point 75 is produced which in turn varies the position of the magnetic head 20 in the respective recording channel. If, prior to a static correction adjustment or a dynamic calibration as discussed hereinafter, fine correction or initial correction of the position of the head 20 in a channel is required, such correction is made by adjusting the trimmer screw. For example, the trimmer pulley of each channel can be used to adjust all of the heads within strict limits to a straight line time scale origin position prior to any operation of the recording apparatus. It should be noted that in order to make a fine adjustment by vertically varying the position of the trimmer screw 77, the pulley lever arm 74 is normally aligned at an angle to the vertical to prevent a dead center situation.

Referring now to FIGURES 1, 2 and 12 the means for obtaining the dynamic time scale component $F_n(t)$ in the time scale transformation $T_n = t + A_n + F_n(t)$ is shown. Referring particularly to FIGURE 12, a dynamic correction lever arm 44 is shown in detail. The dynamic arm 44 is affixed at one end to a rotatable shaft 81 perpendicular thereto. The dynamic arm 44 provides a plurality of affixing points 46 to which the head cable 40 for each channel is affixed. Referring to FIGURES 1, 2 and 12, the plurality of head cables 40 are attached to the lever arm 44 at predetermined distances from the shaft 81, which corresponds to the pivot point 83 of the dynamic arm. The distance from the pivot point 83 at which each cable is affixed to the dynamic arm is determined by the quantity $B_n$ for each channel as described in detail hereinafter. In this embodiment, the present invention is applied to twenty-four channels of a multi-channel recorder with a pair of dynamic arms introducing the function $F_n(t)$ into two series of twelve channels each. In this embodiment the means for affixing the plurality of cables 40 is provided by forming the lever arm 44 of an upper clamping plate 84 and a lower clamping plate 85 which define grooves 86 into each of which a cable end is inserted. In the lever arm shown in FIGURE 12, twelve of such grooves are shown. With the cables positioned in the grooves the upper and lower plates 84 and 85 are pressed together by fastening bolts 87 to clamp the cables firmly in place and to affix them to the lever arm 44 at the proper position. Since the construction and operation of both lever arms 44 and 45 shown in FIGURE 1 are similar, one will be described in construction and operation for purposes of clarity. The lever arm is mounted within the chassis 29 of the multi-channel recorder as shown in FIGURES 1 and 2. The shaft 81 is rotatably affixed to suitable mounting means 82 within the chassis such that the dynamic arm 44 pivots about the pivot point 83 in a plane substantially parallel to the plane defined by the plurality of cables extending to the dynamic arm 44 from the trimmer pulleys 42. The shaft 81 is mounted proximate the center channels in FIGURE 1 with each shaft being substantially equidistant from the midpoint of the channels being served by the two dynamic arms 44 and 45. Thus, the dynamic arm 44 rotates in the plane of the cables 40 about the pivot point 83. It may be seen that the cable which is affixed to the dynamic arm 44 at the affixing point 46 furthermost from the pivot point 83 will be moved through the greatest distance by rotation of the dynamic arm. That is, in FIGURE 12 the cable affixed at the outermost point will be moved through the greatest distance while the cable affixed at the innermost point will be moved the least by rotation of the dynamic arm 44 through a predetermined angular distance. The head cable 40 for each channel is extended from the respective trimmer pulley 42 through a guide block 88 and to the respective affixing point 46 on the lever arm. In order to maintain the cable 40 in the vertical plane of the pulleys the guide block 88 is mounted upon the chassis with a guide opening through which the cable is passed substantially in the vertical plane of the pulleys. That is, in FIGURE 1 wherein the complete apparatus for the first channel is shown, an opening through the guide block 88 is provided in alignment with the pulleys 41, 42 and the cable 40 is passed through the guide prior to being affixed to the dynamic arm 44. Similar guide openings are provided at each channel. Thus, if the cable is pulled at an angle to the plane of the pulleys by movement of the dynamic arm 44 the movement of the cable at the pulleys is confined to the plane of the pulleys. After being extended from the trimmer pulley 42 for each channel, each cable is affixed at the predetermined respective point on the lever arm corresponding to the channel. In order more clearly to illustrate the positioning of the cables at the lever arm and to clarify the subsequent description of operation, reference may again be made to the application of the present invention in the field of geophysical exploration. For example, as discussed hereinbefore, "move-out" corrections are necessitated by the fact that the seismometer or detector groups are disposed at one side of the shot point. A greater time interval will be required for a reflected wave to reach the outermost detector group than the time interval required to reach an inner detector group from an interface the same vertical distance below each. As the depth of the reflection increases, the time differential becomes smaller and approaches zero as the depth of the reflecting interface approaches infinity. In the embodiment described herein an uncorrected tape serves as a signal source to the apparatus of the present invention to record a corrected tape, channel 1 of the apparatus shown corresponds to the channel of the uncorrected tape upon which the outermost detector signal was recorded. That is, the magnitude of the time scale calibration required is greatest at channel 1 and decreases at each channel with the least correction required at channel 12. Since the correction required by the horizontal time interval decreases as the time increases, the time scale corrections required for each channel decrease as the drum rotates. After sufficient time has elapsed to allow the time interval due to the horizontal distance between the detectors as recorded upon the uncorrected tape to become proportionally insignificant, the time scale correction for each channel will be zero and the magnetic heads for all channels will be aligned. The amount of relative movement between the heads is determined by the positions at which the head cables 40 for a given channel are affixed to the dynamic arms 44 and 45. In addition the rate of change of position is determined by the rate at which the dynamic arms 44 and 45 are moved through the required angular distance. Thus, the dynamic time scale calibration is defined for each channel as $B_nF(t)$ where $n$ denotes any channel, $B_n$ is determined by the location of the head cables 40 on the dynamic arms 44 and 45 and $F(t)$ is determined by the rate of movement of the arms, both of which may be varied in accordance with this invention to obtain any linear or non-linear function of time scale calibration $B_nF(t)$.

Referring now solely to the portion of the function $B_nF(t)$ determined by the position of the cable 40 on the lever arm 44, i.e., $B_n$, it may be seen in FIGURE 1 that when the cable 40 is affixed to the dynamic arm 44 the dynamic arm is urged forward in FIGURE 1, or in a counterclockwise position. That is, since the cable 40 for each channel is under tension it will exert a pull to the left in the figure. A stop 89 is affixed to the chassis to limit the counterclockwise movement of the arms 44 and 45. If the arms 44 and 45 are then moved clockwise the magnetic heads 20 will be moved to the left in FIGURE 2 since the cables 40 are of constant length.

It will be seen from FIGURE 1, that if the dynamic lever arm is sufficiently distant from the guide block 88, the cables will remain substantially parallel during the relatively small angular distance of travel of the lever arm and the distance through which each head is moved is proportional to the distance from the pivot point at which its respective cable is affixed to the lever arm. If, however, the lever arm is sufficiently proximate the guide block to introduce non-proportional movement of the cables due to the varying angles of the cables between the lever arm and guide block, a second guiding means is necessary. That is, in order to produce proportional movement of the cables due to rotation of the lever arm it is necessary that the cables all be pulled in substantially parallel arrangement. One means for achieving the parallel arrangement in a compact unit is to position a second guide block proximate the lever arm with openings for each cable spaced substantially the same as the spacing of the cables upon the lever arm.

Means are provided for rotating the dynamic arm a predetermined angular distance at a predetermined rate, for example, from the forward position at which the arm 44 rests against the stop 89 to the position shown in FIGURE 1. In the presently preferred embodiment of the present invention an actuating cable 90 is affixed to the dynamic arm 44 extending oppositely to the direction of movement of the arm 44 which is urged by the tension in the cables 40. The cable 90 is affixed to a pulley 92 which is affixed to the inner end of a rotating first shaft 93 extending through the side wall 94 of the chassis 29. The pulley 92 lies substantially in the plane of the cable 90 while the shaft is substantially perpendicular thereto. In this embodiment, the shaft 93 is substantially perpendicular to the side wall 94 and the plane of the cable 90 and pulley 92 is substantially parallel thereto. The first shaft is tubular and rotatably mounted in a bearing surface defined by the side wall with a second shaft pulley 95 affixed to the second end of the first shaft 93. The first shaft is longitudinally affixed by means of brackets 97 and 98 positioned adjacent the opposite ends of the first shaft to act as thrust bearing therefor. A second shaft 96 extends through the first shaft and is rotatably supported therein. The second shaft 96 is longitudinally affixed by brackets 99 and 100 which are positioned adjacent the inner end 101 and outer end 102 of the shaft and which define bearings within which the shaft rotates. In addition, a support bearing is provided in the bracket 97 through which the second shaft extends. A second pulley 105 is affixed to the inner end 101 of the second shaft 96 and lies substantially in the plane of the actuating cable 104 which is affixed to the second dynamic arm 45 as described in connection with the first dynamic arm 44. A second shaft pulley 106 is affixed to the outer end 102 of the second shaft outwardly of the shaft pulley 95 of the first shaft. Thus, it may be seen that the first shaft 93 and second shaft 96 may be rotated independently by turning the respective pulleys 95 and 106. Rotation of the first shaft 93 causes the dynamic arm 44 to be moved which in turn causes movement of the magnetic heads 20 affixed thereto, while rotation of the second shaft 96 causes movement of the second dynamic arm 45 and the series of heads affixed thereto.

It should be noted at this point that although the discussion is directed toward the operation of twenty-four channels, eleven are affixed to each of the dynamic arms. The two central channels, i.e., the channel corresponding to number 12 in each series, are stationarily affixed to a portion of the chassis. Although all channels may be affixed for movement, the innermost channel in each series will customarily be used as a calibration point with no movement or correction required. Thus, in the seismographic example the two stationary channels would correspond to the innermost detector group in each series extending away from the shot point, and each detector group in the series will be calibrated with respect to the innermost group.

Referring now to FIGURES 1 and 6 through 11, the means of the present invention for imparting the required rotation to the shaft pulleys 95 and 106 in order to define the portion $F(t)$ of the function $B_nF(t)$ at the magnetic heads is shown. The drum 21 is driven at constant speed by means well known to the art, such as a synchronous motor which is not shown. The rotating shaft 110 of the drum 21 extends through the sidewall 94 of the apparatus chassis 29 and rotates within a bearing mounted in the side wall. Affixed to the side wall 94 is a magnetic clutch 111 or other engaging means of the type well known to the art which can be engaged to rotate with the drum shaft 110. The magnetic clutch is mounted symmetrically with respect to the drum shaft and can be energized by an electrical signal to become directly connected to the shaft and rotate therewith. The driven portion of the magnetic clutch, i.e., the portion of the clutch which rotates with the shaft when the clutch is engaged, is connected to a rotating cam means 114. The clutch may be connected with the cam means to drive the cam by methods known to the art. Thus, it may be directly connected, or connected through a belt, or driving chain. In the embodiment shown a belt drive is used. Referring to FIGURES 6 and 7 a cam shaft 116 is rotatably mounted by means of bearings upon the side wall 94 of the apparatus chassis at a position above the magnetic clutch 111. A driven pulley 117 is affixed to the cam shaft 116 substantially in the plane of the driving pulley 118 of the clutch 111. The cam 115 is removably affixed to the cam shaft 116 in order that different cams may be utilized for different applications of the apparatus in order to determine the necessary function $F(t)$. A driving belt 120 is connected between the cam shaft pulley 117 and the clutch pulley 118. In this embodiment a one to one ratio is used between the clutch pulley and cam shaft pulley such that the cam 115 rotates at the same angular rate as the clutch and consequently at the same angular rate as the drum 21. As discussed hereinbefore the cam surface 121 of the cam 115 is determined by the application in which the apparatus is utilized and the function of movement to be produced.

A connecting rod 122, as shown in FIGURES 6 and 9, is affixed to the side wall 94 and is substantially horizontally mounted for horizontal sliding movement. The connecting rod 122 is mounted proximate the horizontal centerline of the cam shaft 116 with a cam follower 123 rotatably affixed to the end of the connecting rod 122 in bearing contact with the cam surface 121. The connecting rod is horizontally urged toward the cam, by means which will be more apparent hereinafter, to maintain the cam follower 123 in contact with the cam surface. Thus, the cam 115 when rotated imparts a horizontal movement to the connecting rod 122 which is dependent upon the cam configuration.

A first linkage rod 125 and a second linkage rod 126 are affixed to the connecting rod 122. The linkage rods are similar and correspond to the two dynamic calibration arms 44 and 45 to allow different amounts of motion to be transmitted to the two dynamic arms from the cam 122. The linkage rods 125, 126 extend substantially vertically from the connecting rod 122 and are affixed to opposite sides thereof. The linkage rods lie in substantially parallel planes and are pivoted about movable pivots discussed hereinafter. The lower end of the linkage rods are pivotably affixed to a first horizontal connecting rod 127 and a second horizontal connecting rod 128.

Referring to FIGURES 6, 8, 10 and 11, the linkage rods are similar in construction and operation and only one will be described in detail. Positioned adjacent to but spaced from the linkage rod 125 is a pivot bearing plate 129 which is located to the outer side of the linkage rod with respect to the side wall 94. The pivot bearing plate 129 lies in a substantially vertical plane and defines a vertical groove in the inner surface thereof having a centerline substantially in the plane of the linkage rod 125 when the linkage 125 is in the vertical position, i.e., the slot is proximate and parallel to the linkage when the linkage is vertical. A bearing 131 is positioned in the slot and is of sufficient height and width that it is horizontally retained by the groove but vertically movable therein. A pivot 132 is affixed to the pivot bearing 131 and extends inwardly where it is rotatably mateable with a pivot groove 133 in the adjacent face of the linkage rod 125 which extends along the centerline of the linkage rod. Thus, if the pivot bearing 131 is maintained in a constant position, the linkage rod is pivoted about the pivot 132 in that position. Means are provided for varying the pivot 132 to a predetermined position and maintaining the pivot at the predetermined position. In this embodiment a first end 134 of an adjusting cable 135 is affixed to the pivot bearing 131 and extends substantially vertically upward therefrom. The adjusting cable 135 passes over an idler pulley 137 which is rotatably mounted upon the pivot bearing plate 129 and lies in the plane of the vertically extending cable tangentially to the cable 135. The cable 135 then extends downwardly and crosses under a second idler pulley 138 which is again rotatably mounted in the vertical plane of the cable 135. From the second idler pulley 138, the adjusting cable 135 extends to, and crosses over an adjusting pulley 139. The adjusting pulley 139 is mounted substantially in the vertical plane of the cable by means of a mounting bracket 141 which is affixed to, and spaced outwardly from, the side wall 94 of the chassis. The adjusting pulley 139 is rotatably mounted by means of the bracket 141 and an adjusting knob of substantially greater diameter is affixed thereto. After passing over the adjusting pulley 139 the cable 135 is reversed in direction and extends inwardly where it again crosses over the second idler pulley 138. From the idler pulley 138 the adjusting cable extends downwardly and crosses under a third idler pulley 143. The third idler pulley is mounted below the pivot bearing 131 similarly to the first idler pulley 137 and vertically aligned therewith such that the innermost tangent to the third idler pulley is vertically aligned with the pivot bearing 131. Accordingly, after passing under the third idler pulley 143 the adjusting cable 135 extends substantially vertically upward where the second end 144 of the cable is affixed to the pivot bearing 131. Thus, the adjusting cable 135 is a closed loop adjustment with the ends of the cable affixed to, and extending oppositely from, the pivot bearing 131. When the adjusting knob 142 is rotated the adjusting pulley 139 causes the cable 135 to be shifted and consequently causes the pivot bearing and pivot 132 to be raised or lowered. Thus, by means of the adjusting knob 142 the amount of horizontal travel of the linkage rod 125 can be varied by shifting the pivot point of the linkage. That is, if the pivot 132 is moved to a position midway along the length of the linkage rod 125 the amount of horizontal movement of the lower connecting rod 127 is equal to the horizontal movement of the upper connecting rod 122 imparted by the cam 115. If the pivot point 132 is lowered, the proportional amount of movement of the lower connecting rod relative to the upper connecting rod becomes less, and conversely becomes greater when the pivot point 132 is moved above the midpoint.

The construction and operation of the means for adjusting the pivot point of the second linkage rod 126 is similar to that described in connection with the first linkage except that the linkage rod 126 and pivot are of opposite hand. In addition, the side wall 94 serves as the mounting surface for the adjusting components.

It should be noted that since the linkage rods 125, 126 are connected between horizontally moving connecting rods, the distance between the points at which the linkage rod is affixed to the connecting rods will increase when the linkage rod is inclined from the vertical. Accordingly, the linkage rod is pivotally affixed to the lower connecting rod while a slot 145 is provided in the linkage rod at the upper end which is rotatable about the pivot point 146 to allow an effective increase in the length of the linkage rod.

As shown in FIGURES 3, 6 and 11, a first actuating cable 148 is affixed to the first lower connecting rod by a screw 149. The actuating cable 148 extends substantially horizontally to an idler pulley 150 from which it extends vertically upward and is affixed over the outer shaft pulley 106 of the second shaft 96, such that horizontal movement of the connecting rod 127 causes rotation of the second shaft 96. Similarly, a second actuating cable 151 is affixed to the second idler pulley upward to the second shaft pulley of the first shaft 93 to cause rotation of the first shaft by movement of the second connecting rod 128.

Thus, movement of the upper connecting rods 122 by rotation of the cam 115 is transmitted through the first and second linkage rods 125 and 126 independently to the shafts 93 and 96 to cause the dynamic correction levers to be moved in response to the cam signal and in turn to move each of the magnetic heads 20 in accordance with a predetermined function $B_nF(t)$. Thus, calibration of the time scale is achieved by movement of the dynamic correction lever 45 for each series of magnetic heads which are affixed to the lever 45. The position of each cable 40 affixed to the dynamic correction lever determines the relative movement between respective heads in the series. The dynamic correction may be made linear or non-linear by suitably varying the configuration of the cam 115 which in turn varies the rate of rotation of the dynamic correction lever. Further variation of the dynamic correction movement of the heads is obtained through the variable pivot about which the linkage rod 125 pivots in transmitting movement from the cam to the dynamic lever arm. As discussed hereinbefore each series of heads may be independently varied by varying the pivot points to alter the magnitude of movement transmitted by the cam 115 through the linkage. That is, if the adjusting knob 142 is turned to lower the pivot point in the first linkage rod beneath the midpoint of the first linkage rod 125, while the pivot point of the second linkage rod 126 is at or above the midpoint, the heads of both series will move in proportion to the same time scale function $F(t)$ but the magnitude of movement of the first series will be less than that of the second series.

Thus, in operation the present invention is used to introduce a time scale to each channel of a multi-channel recording apparatus, by applying to the time scale $t$ a transformation of the form $T_n = t + A_n + B_nF(t)$ where the parameter $A_n$ and the function $B_nF(t)$ vary from channel to channel as indicated by the index $n$. The present invention may be applied to the recording apparatus when the apparatus is being used to "read" or "write," but in the embodiment shown the apparatus has been described in connection with the writing operation. In the illustrative embodiment electrical impulses obtained from a plurality of detector groups (not shown) have been magnetically recorded on a magnetic tape. In order to apply the time scale transformation to obtain a corrected magnetic tape, signals emanating from the previously recorded tape are transmitted to the magnetic recording apparatus of the present invention to the writing heads of the apparatus shown. A magnetic tape of the type well known to the art is affixed to the surface of the drum 21 which is rotated at constant speed beneath the magnetic heads 20 during arrival of electrical impulses at the heads 20. The corrections to be applied are determined prior to recording of the signals and the proper dynamic calibration levers 44 and 45 and the proper cam 115 are chosen to introduce the required function $B_nF(t)$.

It should again be noted, as discussed hereinbefore, that although a corrected magnetic tape is recorded from a previously recorded uncorrected tape in this illustrative operation, the apparatus can be used with reading heads to transmit a corrected output signal to a second recording device by mounting the uncorrected tape upon the drum.

Prior to operation of the apparatus, all of the magnetic heads are accurately aligned to a common origin by use of the trimmer pulley 42. To correct for manufacturing tolerances and errors in the length of cables 40 and in other assembled parts of the apparatus the origin is corrected by setting the index mark on each cam protrusion at a zero reading in the vertical cam slots 53. This setting is achieved by varying the position of the cams 51 vertically until the index mark of all cams are at a zero reading. The heads are then horizontally aligned with respect to the surface of the drum 21 by turning the adjusting screw 77 corresponding to each trimmer pulley to vary the position of each trimmer pulley until the recording heads for all channels are aligned. At this point all channels are aligned at a common time scale origin with no corrections applied.

After the magnetic heads have been aligned to a common origin by means of the trimmer pulley 42 for each channel, the parameter $A_n$ is introduced into each channel. $A_n$ is predetermined for each channel by methods known to those skilled in the art to correct each channel from the origin in accordance with the application to which the apparatus is applied. That is, for a particular physical layout of detector groups on a known terrain the static correction for a given channel to compensate for surface profile on near-surface weathered material under the different detector groups may be determined. For applications of recording apparatus other than geophysical exploration the initial time scale correction may be made for various considerations. The correction $A_n$ is, therefore, made for each channel by lowering the turning knob 70 and moving the turning shaft 64 to the position beneath the cam shaft 54 of the channel being corrected. The turning knob 70 is then released to allow the spring loaded shaft 64 to engage the cam shaft 54. By turning the knob 70 the cam 51 is raised or lowered to rotate the static correction pulley 41 which in turn causes the head 20 in that channel to be moved to the required position.

In order more clearly to describe the operation of the dynamic corrections introduced by means of the present invention during rotation of the drum 21, an operation will be described in which $A_n$ for each channel is equal to zero and $B_nF(t)$ is a function determined by moveout corrections in a geophysical exploration arrangement of seismometer detector groups in which twelve detector groups are positioned at opposite sides of a shot point. In the illustrative example detector groups correspond to similarly numbered channels in the recording apparatus with detectors twelve and thirteen positioned nearest the shot point at opposite sides thereof and detectors one and twenty-four farthest removed at opposite sides of the shot point. The detector groups, each of which transmits a signal to be recorded in a channel, are, therefore, divided into two series of twelve channels each, distributed on each side of the shot point. Prior to operation of the recording apparatus the distribution of the fixed points 46 on the first and second dynamic correction lever arms 44 and 45 are determined to compensate for the relative horizontal distance of each detector from the shot point. No correction is to be applied to channels twelve and thirteen so the fixed point corresponding to each of these channels is not positioned on the lever arms 44, 45 but is stationary with respect to the apparatus. The proper cam 115 for a given application is then affixed to the cam shaft 116 to impart the varying rate of movement to the dynamic correction lever arms 44, 45 for a given application as will become more apparent hereinafter.

The pivot points 132 for the first linkage rod 125 and second linkage rod 126 are then vertically adjusted to obtain the required amount of movement of the magnetic heads proportional to the movement imparted by the cam 115. That is, assuming for purposes of illustration that the movement of the first series of heads affixed to the first lever arm 45 is to be equal to the movement of the second series of heads, and that a one to one ratio between the horizontal movement of the cam follower 123 and the cables 148 and 151 is required; the pivot points 132 would be positioned at the midpoint of the linkage rods. Therefore, the adjusting knobs 142 for both the first and second linkage rods are rotated until the pivot points are correctly positioned at the midpoint. Accordingly, movement of the cam follower 123 through a predetermined distance to the left in FIGURE 6 will cause the lower end of the first and second linkage rods 125 and 126 to be horizontally moved a substantially equal distance to the right in the figure. Movement of the lower end of the rods transmits an equal amount of vertical travel downward to the first actuating cable 151. In the illustrative embodiment shown, the actuating cables 148 and 151 are affixed to the driving pulley 95 of the first shaft 93 and the driving pulley 106 of the second shaft 96 such that the cables are tangential to the forward side of the pulleys, i.e., to the left side in FIGURE 1. Downward movement of the cables therefore causes the first and second shaft to be rotated counterclockwise in FIGURES 1 and 2. As shown in FIGURE 2 the connecting cables 90 and 104 between the lever arms 44 and 45 are affixed to the driven pulleys 92 and 105 of the first and second shafts 93 and 96 tangentially to the lower side of the pulleys. Counterclockwise rotation of the shafts accordingly causes the connecting cables 90 and 104 to be wound on the pulleys which in turn causes the lever arms 44 and 45 to be pivoted rearward. Thus, in FIGURE 1 the ends of the levers 44 and 45 away from the pivot points 83 will move rearward or to the right in FIGURE 1. When the driving pulley and driver pulley on the shaft have equal diameters as in the illustrative embodiment, the distance through which the connecting cable 90 is moved is equal to the distance through which the actuating cable 148 is moved.

As the connecting cables 90 and 104 for each dynamic correction lever arm 44 and 45 are pulled to the right in FIGURE 1, the cables 40 corresponding to the outermost channels one and twenty-four are moved through the greatest distance forward, or to the left in FIGURES 1 and 2, due to their greatest distance from the pivot point 83 as shown in FIGURE 12. The cables affixed to heads in each series which are progressively nearer the pivot points will move a correspondingly lesser distance, while the cables in channels twelve and thirteen will remain stationary.

Thus, in the seismographic illustration with an uncorrected previously recorded magnetic tape on the drum 21, a cam 115 is selected for the proper moveout correction with a portion of the cam surface at a substantially constant diameter at which the linkage rods 125, 126 are in the vertical position. With the heads 20 trimmed to a common time scale origin, and with the static correction $A_n$ equal to zero in all channels, the plurality of magnetic heads 20 are all aligned along a common line on the circumference of the drum 21. The drum 21 is then set in rotation at a steady rate. The cam 115 is so synchronized that at time $t=0$ corresponding to the previously recorded tape time of the shot initiation, the lobe of the cam has passed to the position at which the cam follower is moved the maximum distance to the left. This causes the maximum move-out correction; that is, at time $t=0$ the heads 20 have been moved out of alignment by moving the lever arms 44 and 45 rearward as discussed hereinbefore. The heads therefore assume a shallow V-shape or U-shape dependent upon the distribution along the lever arms, with channels one and twenty-four moved farthest from the origin line. With the drum rotating clockwise in FIGURE 2 it may be seen that all channels other than channels 12 and 13 have been advanced along the time scale with the maximum advance being accomplished by channels 1 and 24. Since the outermost channels (1 and 24) correspond to the outermost detector groups in the seismometer spread, the time delay due to the horizontal distance will be the greatest at these detectors and channels. As $t$ increases and the drum 21 and cam 115 continue to rotate the moveout correction required becomes less as discussed hereinbefore. Accordingly, the radius of the cam surface is decreasing in accordance with the function $F(t)$ until at a predetermined time no further correction is required. At this time the cam has moved to the position at which the cam follower is on the minimum radius and all heads have been moved into alignment.

From the foregoing it will be seen that the static correction $A_n$ which is introduced into each channel as previously described will be superimposed upon the movement of the heads due to the dynamic correction and that for each channel the total time scale variation is additive such that $T_n = t + A_n + F_n(t) = t + A_n + B_n F(t)$.

Thus, the present invention provides an improved magnetic recording apparatus having means for varying the origin point of the electrical signal to be recorded upon, or read from the recording surface of a rotating recording drum and to furnish linear or non-linear time scale calibrations to each channel of a multi-channel recording system.

What is claimed is:
1. In a multi-channel magnetic recording apparatus of the type wherein a plurality of signals is transmitted to a plurality of magnetic reproducing heads positioned proximate the circumference of a rotating cylindrical record, the record having a plurality of spaced apart parallel channels, each of the reproducing heads being mounted for relative movement in a respective one of the channels, means for independently varying the time scale position at which each of the reproducing elements is proximate the circumference in the respective channel in accordance with time scale transformation

$$T_n = t + A_n + B_n F(t)$$

where $T_n$ is the transformed time scale of the $n$th channel, $t$ is the original time scale common to all channels, $A_n$ is a predetermined additive constant corresponding to said $n$th channel, $B_n$ is a predetermined constant of proportionality corresponding to said $n$th channel, and $F(t)$ is a predetermined function of $t$, comprising: a rotating drum affixed to a shaft, said drum having a magnetically sensitive circumferential recording surface; a plurality of head mounting means positioned proximate said surface in side by side relationship, a plurality of magnetic heads each affixed respectively to one of said mounting means; each of said mounting means being arcuately movable with respect to said surface, means normally urging said mounting means in one arcuate direction; a plurality of flexible cables of substantially constant length each affixed at the first end thereof to one of said mounting means and extending tangentially therefrom in the direction opposed to said one arcuate direction and in a plane substantially perpendicular to the plane of rotation of said drum; a plurality of static correction means each respectively in one of said channels, each of said cables extending over the respective one of said static correction means, said static correction means being movable in the plane of said flexible cable to vary the position of said cable; means for varying said static correction means to vary said respective head mounting means by a predetermined amount equal to $A_n$; and dynamic calibration means, said dynamic calibration means including a dynamic calibration rigid lever arm, said plurality of flexible cables affixed at the second end thereof to said dynamic lever arm each at a predetermined position thereon, said predetermined positions being determined by the mathematical function $B_n$ of the time relationship of signals received by the respective heads, said lever arm being pivotally mounted for arcuate movement in a plane substantially parallel to the axis of rotation of said drum, and means for rotating said dynamic lever arm in accordance with the predetermined function $F(t)$.

2. In a multi-channel magnetic recording apparatus of the type wherein a plurality of signals is transmitted to a plurality of magnetic reproducing heads positioned proximate the circumference of a rotating cylindrical record, the record having a plurality of spaced apart parallel channels, each of the reproducing heads being mounted for relative movement in a respective one of the channels, means for independently varying the time scale position at which each of the reproducing elements is proximate the circumference in the respective channel in accordance with the time scale transformation $$T_n = t + A_n + B_n F(t)$$

where $T_n$ is the transformed time scale of the $n$th channel, $t$ is the original time scale common to all channels, $A_n$ is a predetermined additive constant corresponding to said $n$th channel, $B_n$ is a predetermined constant of proportionality corresponding to said $n$th channel, and $F(t)$ is a predetermined function of $t$, comprising: a rotating drum affixed to a shaft, said drum having a magnetically sensitive circumferential recording surface; a plurality of head mounting means positioned proximate said surface in side by side relationship, a plurality of magnetic heads each affixed respectively to one of said mounting means; each of said mounting means being arcuately movable with respect to said surface, means normally urging said mounting means in one arcuate direction; a plurality of flexible cables of substantially constant length each affixed at the first end thereof to one of said mounting means and extending tangentially therefrom in the direction opposed to said one arcuate direction and in a plane substantially perpendicular to the plane of rotation of said drum; a plurality of static correction means each respectively in one of said channels, each of said cables extending over the respective one of said static correction means, said static correction means being movable in the plane of said flexible cable to vary the position of said cable; means for varying said static correction means to vary said respective head mounting means by a predetermined amount equal to $A_n$; and dynamic calibration means, said dynamic calibration means including a dynamic calibration rigid lever arm, said plurality of flexible cables affixed to said lever arm each at a predetermined position thereon, said predetermined positions being determined by the mathematical function $B_n$ of the time relationship of signals received by the respective heads, said lever arm being pivotally mounted for arcuate movement in a plane substantially parallel to the axis of said rotating drum and coextensive with said plurality of cables, an actuating cable affixed to said lever arm, said actuating cable extending from said dynamic lever arm oppositely to said plurality of cables, said actuating cable affixed to a pulley, said pulley being positioned in a plane substantially perpendicular to the axis of rotation of said drum, said pulley being affixed to a rotatable shaft, means interconnecting said rotatable shaft and said rotating drum shaft, said means including a dynamic cam interposed between said rotating drum shaft and said rotatable shaft for rotating said rotatable shaft in accordance with the predetermined function $F(t)$.

3. In a multi-channel magnetic recording apparatus of the type wherein a plurality of signals is transmitted to a plurality of magnetic reproducing heads positioned proximate the circumference of a rotating cylindrical record, the record having a plurality of spaced apart parallel channels, each of the reproducing heads being mounted for relative movement in a respective one of the channels, means for independently varying the time scale position at which each of the reproducing elements is proximate the circumference in the respective channel in accordance with the time scale transformation $$T_n = t + A_n + B_n F(t)$$

where $T_n$ is the transformed time scale of the $n$th channel, $t$ is the original time scale common to all channels, $A_n$ is a predetermined additive constant corresponding to said $n$th channel, $B_n$ is a predetermined constant of proportionality corresponding to said $n$th channel, and $F(t)$ is a predetermined function of $t$, comprising: a rotating drum affixed to a shaft, said drum having a magnetically sensitive circumferential recording surface; a plurality of head mounting means positioned proximate said surface in side by side relationship, a plurality of magnetic heads each affixed respectively to one of said mounting means; each of said mounting means being arcuately movable with respect to said surface, means normally urging said mounting means in one arcuate direction; a plurality of flexible cables of substantially constant length each affixed at the first end thereof to one of said mounting means and extending tangentially therefrom in the direction opposed to said one arcuate direction and in a plane substantially perpendicular to the plane of rotation of said drum; a plurality of static correction means each respectively in one of said channels, each of said cables extending over the respective one of said static correction means, said static correction means being movable in the plane of said flexible cable to vary the position of said cable; means for varying said static correction means to vary said respective head mounting means by a predetermined amount equal to $A_n$; and dynamic calibration means, said dynamic calibration means including a dynamic calibration rigid lever arm, said plurality of said flexible cables affixed at the second end thereof to said lever arm each at a predetermined position thereon, said predetermined positions being determined by the mathematical function $B_n$ of the time relationship of signals received by the respective heads, said lever arm being pivotally mounted for arcuate movement in a plane substantially parallel to the axis of said rotating drum and coextensive with said plurality of cables, an actuating cable affixed to said lever arm, said actuating cable extending from said dynamic lever arm oppositely to said plurality of cables, said actuating cable being affixed to a pulley, said pulley being positioned in a plane substantially perpendicular to the axis of rotation of said drum, said pulley being affixed to a rotatable shaft, a dynamic cam rotatably affixed to said apparatus, driving means interconnecting said rotating drum shaft and said dynamic cam whereby said dynamic cam is rotated by said rotating drum shaft; a first connecting rod slidably affixed to said apparatus proximate said cam, said first connecting rod having a bearing surface in contact with the surface of said cam whereby said connecting rod is moved in accordance with the portion $F(t)$ of the function $B_n F(t)$, said first connecting rod being affixed to a variable pivot linkage at one end of said linkage, a second connecting rod slidably mounted and affixed at a second end of said linkage, said second connecting rod being movable substantially parallel to said first connecting rod; a variable pivot about which said linkage is pivotable, means for varying the position of said pivot transversely to the direction of motion of said connecting rods to provide a factor of proportionality to the function $F(t)$ at said second connecting rod, and means connecting said second connecting rod and said rotatable shaft.

4. In a multi-channel magnetic recording apparatus for reproducing from a moving magnetic recording medium having a plurality of channels in fixed relationship thereon, which apparatus includes a plurality of reproducing heads each of which is mounted for relative movement in a respective one of the channels for reproduction of time-varying signals on the recording medium, means adapted for continuously varying the relative time-scale position of each of said heads during the movement of said medium, which position is a function of the time relationship of the signals received by the respective head comprising: a rigid lever arm pivotable about an axis, cam means operatively connected to said lever arm for imparting predetermined pivotal movement to said lever arm, a plurality of linkages each between a respective one of said heads and a point on said lever arm for transmission of movement to said heads in response to pivotal movement of said lever arm, each of said linkages being adapted to be positioned at a predetermined linkage point on said lever arm, each of said linkage points being at a predeterminable substantially constant distance from said axis, which distances are determined by a non-linear mathematical function of said time relationship of said signals received by said respective heads whereby each of said heads is movable in the respective channel in response to pivotal movement of said lever arm, the rate of movement of said head being substantially in proportion to said predeterminable distance.

5. In a multi-channel magnetic recording apparatus of the type wherein a plurality of signals is transmitted to a plurality of magnetic reproducing heads positioned proximate the circumference of a rotating cylindrical record, the record having a plurality of spaced apart parallel channels, each of the reproducing heads being mounted for relative movement in a respective one of the channels, means for independently varying the time scale position at which each of the reproducing elements is proximate the circumference in the respective channel, which position is a function of the time relationship of the signals received by the heads in the respective channels, comprising: a rotating drum affixed to a shaft, said drum having a magnetically sensitive circumferential recording surface; a plurality of head mounting means positioned proximate said surface in side by side relationship, each of said mounting means being arcuately movable with respect to said surface; a plurality of magnetic reproducing heads, one each of said reproducing heads being affixed to a different one of said mounting means; means normally urging said mounting means in one arcuate direction; a plurality of flexible means of substantially constant length, one each of said flexible means being affixed at a first end thereof to a different one of said mounting means and extending tangentially therefrom in the direction opposed to said one arcuate direction and in a plane substantially perpendicular to the axis of rotation of said drum; a plurality of static correction means, one each of said static correction means being in a different one of said channels, each of said flexible means extending over said respective static correction means, said static correction means being movable in the plane of said flexible means to vary the position of said flexible means; means for varying said static correction means to vary said respective head mounting means by a predetermined amount; a dynamic calibration means, said dynamic calibration means including a dynamic calibration rigid lever arm, each of said plurality of said flexible means being affixed at the second end thereof to said dynamic lever arm at a predetermined substantially constant distance from the pivot point of said lever arm, which distances are determined by a non-linear mathematical function of said time relationship of the signals received by said heads, said lever arm being pivotably mounted for arcuate movement in a plane substantially parallel to the axis of rotation of said drum; and means for pivoting said dynamic lever arm.

6. In a multi-channel recording apparatus wherein a plurality of reproducing heads is movably mounted, such that each of the heads is movable in a respective one of the channels of a moving recording surface, which channels are in fixed relationship, means for continuously varying the time scale position of the plurality of reproducing heads relative to the moving recording surface which positions are a non-linear mathematical function of the time relationship of the signals received by the heads in the respective channels comprising: a plurality of flexible cables, each of said cables being affixed at a first end thereof to a movable reproducing head, said cables extending from said heads substantially in the direction of movement of said heads; a pivotable rigid lever arm, said lever arm being pivotable substantially in the plane in which said plurality of cables lie, the second end of each of said cables being affixed to said lever arm at a predetermined substantially constant distance from the pivot point of said lever arm, which distances are determined as a non-linear mathematical function of said time relationship of the signals received by said heads; and means for pivoting said lever arm at a predetermined rate.

7. In a multi-channel recording apparatus wherein a plurality of reproducing heads is movably mounted, such that each of the heads is movable in a respective one of the channels of a moving recording surface, which channels are in fixed relationship, means for continuously varying the time scale position of the plurality of reproducing heads relative to the moving record surface in each channel which position is a function of the time relationship of the signals received by the heads in the respective channels comprising: a plurality of flexible cables, each of said cables affixed at a first end thereof to a movable reproducing head, each of said cables extending from said respective heads in the direction of movement thereof, each of said cables extending over a variable support point; a pivotable rigid lever arm, said lever arm being pivotable substantially in the plane in which said cables lie and coextensive with said cables, the second end of each of said cables being affixed to said lever arm at a predetermined substantially constant distance from the pivot point of said lever arm, which distances are determined by a non-linear mathematical function of said time relationship of the signals received by said respective heads; and means for pivoting said lever arm at a predetermined rate during movement of said record surface.

8. In a multi-channel magnetic recording apparatus for reproducing from a moving magnetic recording medium having a plurality of channels in fixed relationship thereon, which apparatus includes a plurality of reproducing heads each of which is mounted for relative movement in a respective one of the channels of the recording medium, means adapted for continuously varying the relative time scale position of each of said heads during the movement of said medium, which position is a function of the time relationship of the signals received by the heads in the respective channels, comprising: a rigid lever arm rotatable about an axis, a plurality of head moving means connected respectively to said heads and in operable contact with said lever arm, each of said head moving means being adapted to be positioned at a predeterminable distance from said axis, which distances are determined by a non-linear mathematical function of said time relationship of said signals received by said heads, whereby each of said heads is movable in response to rotation of said lever arm, the rate of movement of said head being substantially in proportion to said predeterminable distance.

References Cited in the file of this patent

UNITED STATES PATENTS

| | | |
|---|---|---|
| 1,876,824 | Adam | Sept. 13, 1932 |
| 1,965,654 | Kirk | July 10, 1934 |
| 2,243,730 | Ellis | May 27, 1941 |
| 2,440,971 | Palmer | May 4, 1948 |
| 2,765,455 | Meriners | Oct. 2, 1956 |

(Other references on following page)

UNITED STATES PATENTS

| | | |
|---|---|---|
| 2,769,037 | Dank | Oct. 30, 1956 |
| 2,783,311 | Scott | Feb. 26, 1957 |
| 2,800,639 | Lee | July 23, 1957 |
| 2,806,757 | Cunningham | Sept. 11, 1957 |
| 2,810,898 | Meiners | Oct. 22, 1957 |
| 2,825,885 | Reynolds | Mar. 4, 1958 |
| 2,876,428 | Skelton | Mar. 3, 1959 |
| 2,940,536 | Bazzoni | June 14, 1960 |
| 3,020,521 | Salvatori et al. | Feb. 6, 1962 |